United States Patent [19]

Toda

[11] Patent Number: 5,037,039
[45] Date of Patent: Aug. 6, 1991

[54] DRAG BRAKING FORCE MEASURING MECHANISM FOR DOUBLE-BEARING FISHING REEL

[75] Inventor: Junichi Toda, Sakai, Japan

[73] Assignee: Shimano Industrial Company, Ltd., Osaka, Japan

[21] Appl. No.: 455,180

[22] Filed: Dec. 22, 1989

Related U.S. Application Data

[62] Division of Ser. No. 196,553, May 20, 1988, Pat. No. 4,899,953.

[30] Foreign Application Priority Data

| May 23, 1987 | [JP] | Japan | 62-77883 |
| Oct. 9, 1987 | [JP] | Japan | 62-155384 |
| Oct. 9, 1987 | [JP] | Japan | 62-155385 |

[51] Int. Cl.⁵ .................................................. A01K 89/00
[52] U.S. Cl. ...................................... 242/223; 242/268; 242/298
[58] Field of Search ............... 242/268, 223, 267, 269, 242/270, 271, 261, 262, 260, 259, 246; 73/862.19, 862.32, 862.44, 121, 130

[56] References Cited

U.S. PATENT DOCUMENTS

| 2,607,219 | 8/1952 | Millard et al. | 73/862.32 X |
| 3,246,859 | 4/1966 | Martin | 242/259 |
| 3,255,981 | 6/1966 | Wood | 242/285 |
| 3,799,472 | 3/1974 | Svenssen | 242/270 |
| 3,946,963 | 3/1976 | Oberg | 242/246 |
| 4,391,419 | 7/1983 | Iwama et al. | 242/245 |
| 4,422,600 | 12/1983 | Preston | 242/271 |
| 4,535,953 | 8/1985 | Omori | 242/318 |
| 4,555,072 | 11/1985 | Hitomi | 242/245 |
| 4,572,455 | 2/1986 | Noda | 242/282 |
| 4,591,108 | 5/1986 | Ban | 242/245 |
| 4,601,437 | 7/1986 | Yoshikawa | 242/245 |
| 4,650,161 | 3/1987 | Kaneko | 242/224 |
| 4,702,431 | 10/1987 | Kaneko | 242/246 |
| 4,804,150 | 2/1989 | Takeuchi | 242/246 X |
| 4,899,953 | 2/1990 | Toda | 242/268 |
| 4,901,944 | 2/1990 | Aoki | 242/268 X |
| 4,930,722 | 6/1990 | Toda | 242/246 X |
| 4,930,723 | 6/1990 | Toda | 242/246 X |
| 4,938,433 | 7/1990 | Toda | 242/224 X |

FOREIGN PATENT DOCUMENTS 2179753 3/1987 United Kingdom .

Primary Examiner—Katherine Matecki
Attorney, Agent, or Firm—Dickstein, Shapiro & Morin

[57] ABSTRACT

A double bearing fishing reel in which an elastic member is interposed between a braking force acting member subjected to the braking action exerted by a drag mechanism and a braking force non-acting member relative-rotatable with respect to the braking force acting member, a pointer is provided at one of both the members, and a display for displaying the braking force is provided at the other, so that the braking force is measurable.

2 Claims, 7 Drawing Sheets

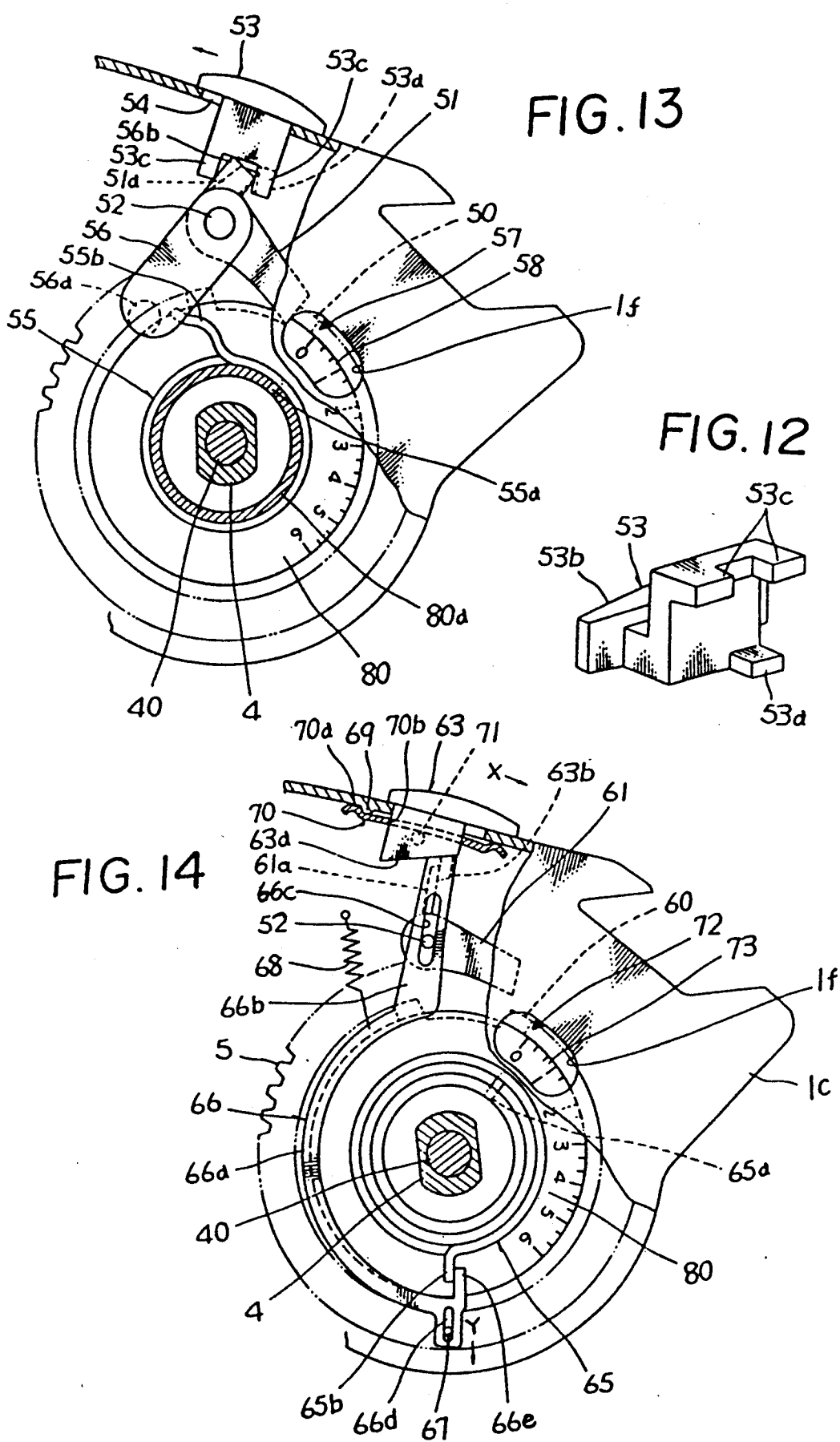

DRAG BRAKING FORCE MEASURING MECHANISM FOR DOUBLE-BEARING FISHING REEL

This is a division of application Ser. No. 196,553, filed May 20, 1988 now U.S. Pat. No. 4,899,953, issued Feb. 13, 1990.

FIELD OF THE INVENTION

The present invention relates to a double bearing fishing reel, and more particularly, to a double bearing fishing reel which rotatably supports a spool shaft having a spool to a reel body having a pair of side frames and which is provided with a drive mechanism for driving the spool and a drag mechanism for exerting the braking action against rotation of the spool with respect to the drive mechanism.

BACKGROUND OF THE INVENTION

Generally, this kind of double bearing fishing reel, as disclosed in Japanese Utility Model Publicaiton Gazette No. Sho 57-28629, includes (1) a spool shaft supported rotatably to a reel body provided with a pair of side frames with the spool shaft fixedly supporting a spool, (2) a drive mechanism provided with a driving shaft, a main gear supported rotatably relative thereto, and (3) a pinion engageable with the main gear and supported to the spool shaft, the driving shaft being driven to rotate the spool shaft; and a drag mechanism provided with a drag disc positioned opposite to the main gear and an adjuster screwing with the driving shaft to urge the drag disc toward the main gear so as to adjust a rotational braking force of the main gear with respect to the driving shaft.

This conventional double bearing fishing reel, however, has no display for displaying the braking force adjusted by the adjuster, thereby creating a problem in that, even when the adjuster is operated to set the braking force of the drag mechanism corresponding to the type of fish to be caught, an angler cannot be informed of the accurate preset braking force.

When the same kind of target fish is intended to be caught, it is preferable to adjust the adjuster to be positioned to obtain an optimum braking force in consideration of the relation between the target fish and the proof stress of a fishing line in use. However, the adjuster is adjusted each time a different kind of fish is hooked, and also is adjustable from a minimum to a maximum of the optimum braking force, whereby even when the optimum braking force is preset, it is difficult for the adjuster to return with accuracy to the position where the optimum braking force is obtained.

Therefore, the adjuster, when shifted corresponding to the target fish, must be adjusted to be positioned to get the optimum braking force every time, or the next fishing must be carried out while keeping the adjuster shifted from the position where the optimum braking force is obtained.

SUMMARY OF THE INVENTION

A main object of the invention is to provide a double bearing fishing reel which can reliably measure and check an accurate braking force preset by the drag mechanism corresponding to a kind of a fish to be caught.

Another object of the invention is to provide a double bearing fishing reel which can always put the adjuster in the position where the optimum braking force is preset and measured, in other words, which can accurately and easily return the adjuster to the position where the optimum braking force is again obtained even when the adjuster is shifted for adjustment from the position where the preset optimum braking force is obtained.

The present invention is characterized in that, in a double bearing fishing reel provided with a reel body having a pair of side frames, a spool shaft having a spool and supported rotatably to the reel body, a drive mechanism for winding a fishing line onto the spool, and a drag mechanism for applying a braking force against rotation of the spool with respect to the drive mechanism, the drag mechanism is provided with an adjuster for adjusting the braking force and a braking force measuring mechanism for measuring the braking force set by the adjuster. The braking force measuring mechanism is provided with an elastic member interposed between a braking force acting member subjected to the braking action exerted by the drag mechanism and a braking force non-acting member rotatable with respect to the braking force acting member, a pointer provided at one of the braking force acting member and the braking force non-acting member, and a display provided at the other and for displaying the braking force of the drag mechanism corresponding to the pointer.

The double bearing fishing reel of the invention can adjust an optimum braking force by the adjuster and measure it by reading a scale of the display coincident with the pointer.

In other words, one of the braking force acting member and the braking force not-acting member is rotated relative to the other so as to measure the braking force. The relative rotation deflects the elastic member and, when its reaction overcomes the braking force adjusted by the adjuster, both the members stop rotation relative to each other. Hence, in this state, the scale of the display coincident with the pointer is read to enable an accurate braking force to be measured.

In addition, the braking force acting member and the braking force non-acting member to be discussed in detail below, are typically constituted by a member non-rotatable relative to the spool shaft, for example, a rotary member coupled therewith, constituting the braking force acting member, and a member rotatable relative to the spool shaft, for example, the spool, constituting the braking force non-acting member. Also, both of these members are constituted of the driving shaft or a member composed mainly of a drag disc at the drive shaft side supported-rotatably supported to the driving shaft as the braking force acting member and the reel body or a member supported thereto as the braking force non-acting member.

The present invention is further characterized by having together with the braking force measuring mechanism a reference position setting mechanism for setting the reference position where the braking force adjusted by the adjuster at the drag mechanism becomes optimum in the relationship between the target fish and the proof stress of the fishing line.

Thus, the braking force measuring mechanism can check the position where the optimum braking force is obtained, and thereafter the adjuster can be specified at the reference position where the optimum braking force is obtained. Hence, the adjuster, even when adjusted to increase or decrease the braking force with respect to the reference position, can simply and accurately be returned to the reference position by setting a position specifying portion at the reference position setting mechanism to a reference portion.

These and other objects of the invention will become more apparent in the detailed description and examples which follow.

BRIEF DESCRIPTION OF THE DRAWINGS

FIG. 12 is a perspective view of an operating member only in the fifth embodiment, FIG. 13 is a partially cutaway side view of the principal portion for operating the operating member, corresponding to FIG. 11, and FIG. 14 is a partially cutaway side view of a sixth embodiment of the invention, showing the principal portion thereof.

DETAILED DESCRIPTION OF THE INVENTION

Figure 1:
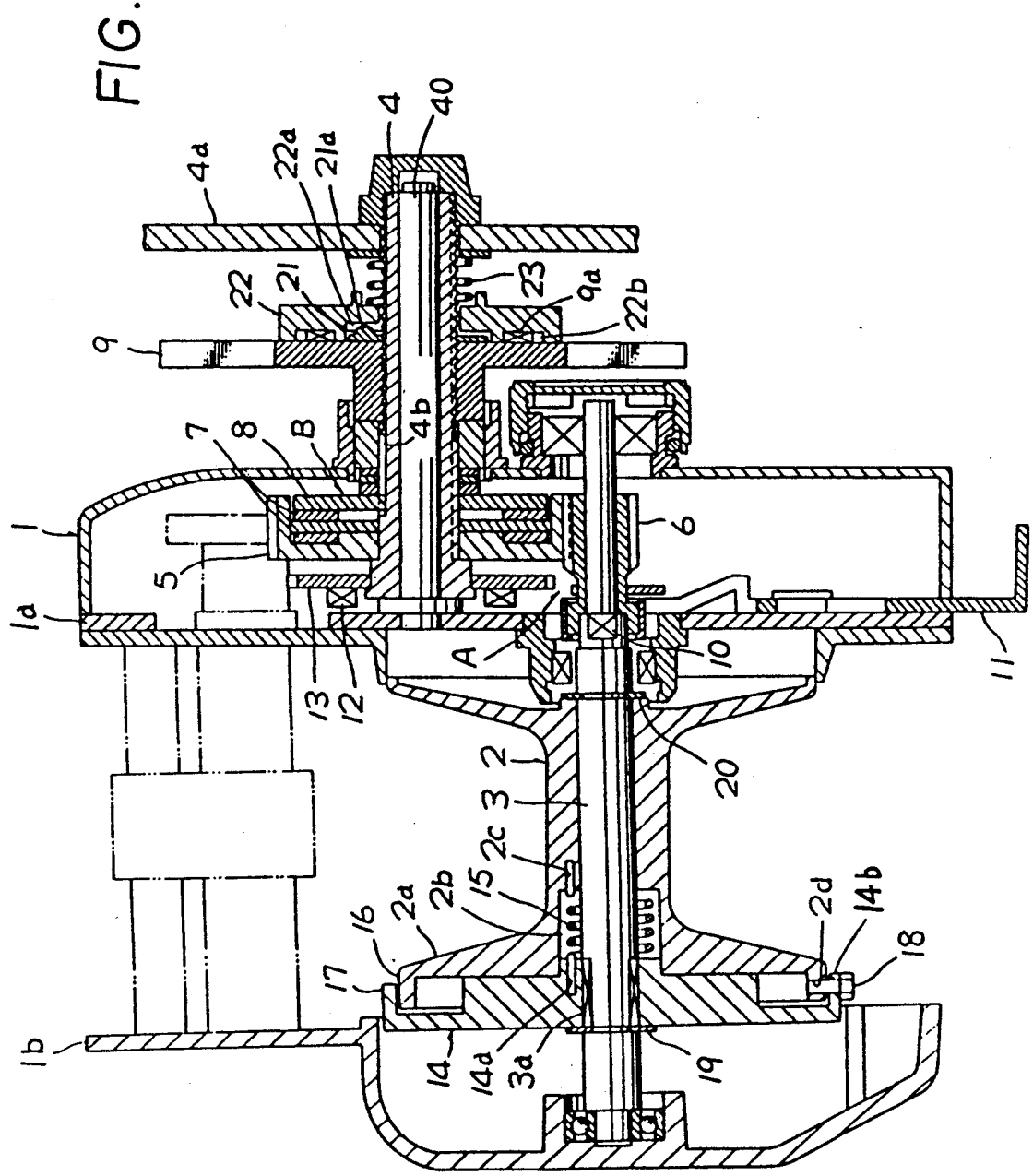
FIG. 1 is a partial sectional view of a first embodiment of a double bearing reel of the invention.

The invention is incorporated into a double bearing fishing reel which is basically constructed with certain conventional features, in which a spool shaft 3 having a spool is rotatably supported between side frames 1a and 1b at a reel body 1; and a drive mechanism A is constituted of a driving shaft 4 (to be hereinafter called the handle shaft) having a handle 4a and rotatably supported to a fixed shaft 40 fixed to one side-frame 1a, a main gear 5 supported to rotate relative to the handle shaft 4, and a pinion 6 engeageable with the main gear 5 and supported to the spool shaft 3. Handle shaft 4 is driven to rotate the spool 2 for winding a fishing line thereon. A drag mechanism B is constituted of drag plates 7 abutting against one side surface of the main gear 5, drag discs 8 abutting against the drag plates 7, and an adjuster 9 screwing with the handle shaft 4 to apply a predetermined load to the drag plates 7. Adjuster 9 rotates to adjust a braking force applied to the main gear 5 with respect to the handle shaft 4 and to apply a predetermined braking force to rotation of the spool 3 with respect to the drive mechanism A.

In addition, in the fishing reel shown in FIG. 1, clutch means 10 is provided between the pinion 6 and the spool shaft 3, and a clutch lever 11 is slidably supported to the first side frame 1a and pushed to axially slide the pinion 6 to disconnect the clutch means 10. A return plate 13 having clutch pins 12 is supported to the handle shaft 4. Handle shaft 4 is reversely rotated to contact the clutch pin 12 with the utmost end of the clutch lever 11 to return the clutch lever 11, thereby engaging the clutch means 10.

Figure 2:
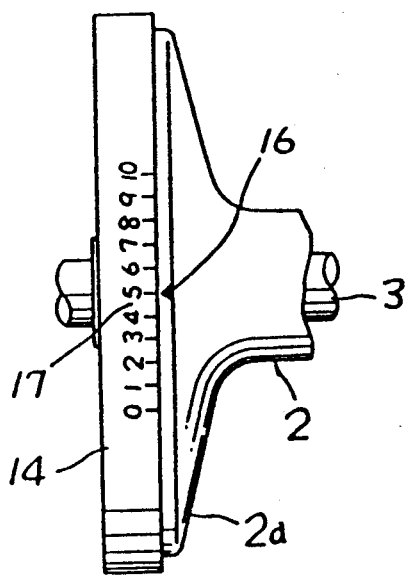
FIG. 2 is a front view of a portion showing the relationship between a pointer and a display.

In a first embodiment of the double bearing fishing reel of the invention shown in FIGS. 1 and 2, the spool 2 is rotatably supported to the spool shaft 3, and substantially a disc-shaped rotary member 14 opposite to the end face of the spool 2 is supported non-rotatably relative to the spool shaft 3. An elastic member 15 of a coil spring having a pair of spring ends is interposed between the spool 2 and the rotary member 14, and a pointer 16 as shown in FIG. 2 is provided at the outer peripheral surface of the flange 2a at the spool 2. A display 17 corresponding to the pointer 16 and for displaying the braking force of the drag mechanism B is provided at the outer peripheral surface of the rotary member 14.

In the above-described construction, at one end surface of the spool 2 are provided a cavity 2b in which the elastic member 15 is contained and a retaining bore 2c extending axially inwardly from the cavity 2b, and the rotary member 14 is provided with an axially extending retaining bore 14a, with spring ends of elastic member 15 being retained in the retaining bores 2c and 14a respectively so as to transmit the rotation of spool 2 to the spool shaft 3 through the elastic member 15.

The spool shaft 3 is provided at the outer surface of one end portion thereof with flat faces to form a portion 3a having a non-round cross section so that the rotary member 14 is fitted non-rotatably relative to the spool shaft 3 through the non-round portion 3a.

At the outer peripheral surface of the flange 2a are provided a plurality of fitting bores 2d which are circumferentially spaced at predetermined intervals, and at the outer peripheral portion of the rotary member 14 is provided a flange 14b opposite to the outer periphery of the flange 2a at the spool 2. A lock pin 18 is supported to the flange 14b to detachably insertable into one fitting bore 2d, thereby constituting a lock means which operates the lock pin 18 to block the rotation of spool 2 with respect to the rotary member 14.

Also, the spool shaft 3 is provided with snap rings 19 and 20 for blocking axial movement of the spool 2 and rotary member 14.

In addition, the fishing reel shown in FIG. 1 is provided at the handle shaft 4 with a reference member 21 having a reference portion 21a which is non-rotatable and axially movable relative thereto, and at one side of the adjuster 9 is provided a position setting member 22 having a recessed position setting portion 22a corresponding to the reference portion 21a. Position setting member 22 is capable of having its position changed with respect to the adjuster 9, thereby allowing the position setting portion 22a to coincide with the reference portion 21a. Hence, the adjuster 9 is adapted to be positioned to obtain the optimum braking force.

The reference member 21 is substantially disc-shaped and has at its center a through bore and an engaging projection projecting inwardly with respect to the inner surface of the through bore and engageable with a groove 4b provided at the outer periphery of the handle shaft 4 and extending axially thereof, thereby being fitted to the handle shaft 4 so as to not rotate relative thereto. Reference portion 21a is provided at one side surface of the outer peripheral portion of the reference member 21. The position setting member 22 is substantially disc-shaped opposite to the adjuster 9 and has a through bore through which the same is fitted onto the handle shaft 4 to rotate relative thereto. Engaging portions 22b and 9a are able to move axially relative to each other and are provided at the position setting member 22 and adjuster 9 respectively so that the position setting member 22 can be associated with the adjuster 9 to rotate in concert therewith. A compression spring 23 is interposed between the position setting member 22 and the handle 4a to maintain the engagement of engaging portions 22b and 9a. The position setting member 22 is moved against the spring 23 to disengage the engaging portion 22b from engaging portion 9b, thereby rotating the position setting member 22 relative to the adjuster 9.

In the fishing reel constructed as described above, prior to fishing, the adjuster 9 is rotated to preset the braking force of the drag mechanism B corresponding to the kind of a fish desired to be caught.

The lock pin 18 is pulled to release the spool 2 from the spool shaft 3 and then the fishing line wound onto the spool 2 is drawn, whereby the spool 2, overcoming the elastic member 15, rotates with respect to the spool shaft 3 and the elastic member 15 is deflected. When an elastic restoring force of the elastic member 15 is larger than a force equivalent to the braking force preset by the drag mechanism B, the spool shaft 3 overcomes the braking force of drag mechanism B, thereby being rotatable together with the spool 2.

At a location where the spool shaft 3 and spool 2 rotate together, the scale of display 17 coincident with the pointer 16 is read, whereby an accurate braking force of drag mechanism B is reliably observed.

After the measurment of the braking force, the lock pin 18 is inserted into the fitting bore 2d to restrain the rotation of spool 2 with respect to the spool shaft 3, thereby preventing the spool 2, during the fishing, from rotation by tension of the fishing line and under a force smaller than the braking force of drag mechanism B.

At the time of observing the accurate braking force of drag mechanism B, the lock pin 18 is operated to restrain the rotation of spool 2 as described above, the position setting member 22 is rotated with respect to the adjuster 9, and the setting member 22 coincides with the reference portion 21a, thereby specifying the position where the optimum braking force is obtained. Hence, even after the adjuster 9 is operated to change the braking force of the drag mechanism B corresponding to a pulling force of a hooked fish, the adjuster 9 is returned to the aforesaid location so as to be accurately and easily put in the position where the preset optimum braking force is obtainable.

Accordingly, the fishing reel of the invention is convenient to use and facilitates fishing. Also, the reference portion 21a engages with the position setting portion 22a so as not to excessively reduce the braking force, thereby preventing the fishing line from being unwound and tangled. The compression spring 23 biases the position setting member 22 to generate sounds when the reference member 21a engages therewith, whereby an angler can listen to the sounds to check whether the adjuster 9 returns to the proper position.

Figure 3:
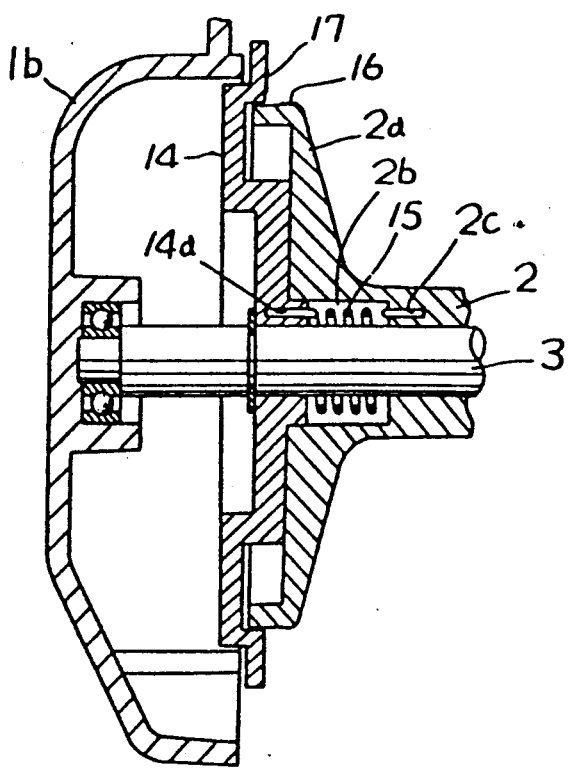
FIG. 3 is a partial sectional view of a second embodiment of the invention showing the principal portions only.

Alternatively, as shown in a second embodiment of the invention in FIG. 3, the spool 2 may be supported non-rotatably relative to the spool shaft 3 and the rotary member 14 may be supported rotatably relative thereto so that the rotary member 14 may be rotated overcoming the elastic member 15, thereby enabling an angler to observe the braking force of the drag mechanism B.

Also, the pointer 16 may alternatively be provided at the rotary member 14 and the display 17 at the spool 2. The elastic member 15 uses the coil spring and is reduced in coil diameter as the spool 2 rotates, but may be compressed, which is not particularly limited in structure.

Also, the reference portion 21a and position setting member 22 are not indispensable. Both these members may be disposed reversely and may not engage but coincide with each other.

Figure 4:
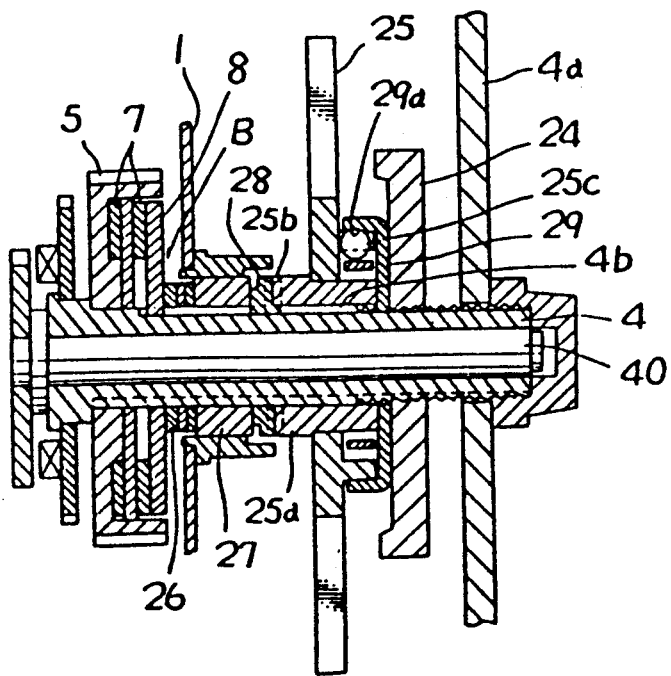
FIG. 4 is a partial sectional view of a third embodiment of the invention, showing the principal portions only.

Alternatively, as shown in a third embodiment in FIG. 4, two first and second adjusters 24 and 25 may be used.

In this case, the first adjuster 24 screws with the handle shaft 4, and between the first adjuster 24 and a drag disc 8 are interposed the second adjuster 25 having a boss 25a and a cam body 28 desirably positioned on the handle shaft 4 through a plurality of washers 26 and a spacer 27. An engaging projection 25b is provided at the end face of the second adjuster 25 opposite to the cam face of the cam member 28. The first adjuster 24 is operated to set a minimum braking force, and also the second adjuster 25 adjusts the braking force set by the first adjuster 24.

In this case, a reference member 29 having a reference portion 29a is supported non-rotatably and axially movably relative to the handle shaft 4 and a position specifying portion 25c preferably using a ball engageable with the reference portion 29a is provided at the second adjuster 25. With the position specifying portion 25c and reference portion 29a being coincident with each other, thereby enabling the second adjuster 25 to be positioned with accuracy to get the optimum braking force.

Alternatively, in the aforesaid embodiments, the elastic member 15 may be interposed between the handle shaft 4 or a member at the handle shaft side including the drag disc 8 and the reel body 1 or a member supported thereto.

Next, explanation will be given of a fourth embodiment shown in FIGS. 5 through 9.

Figure 5:
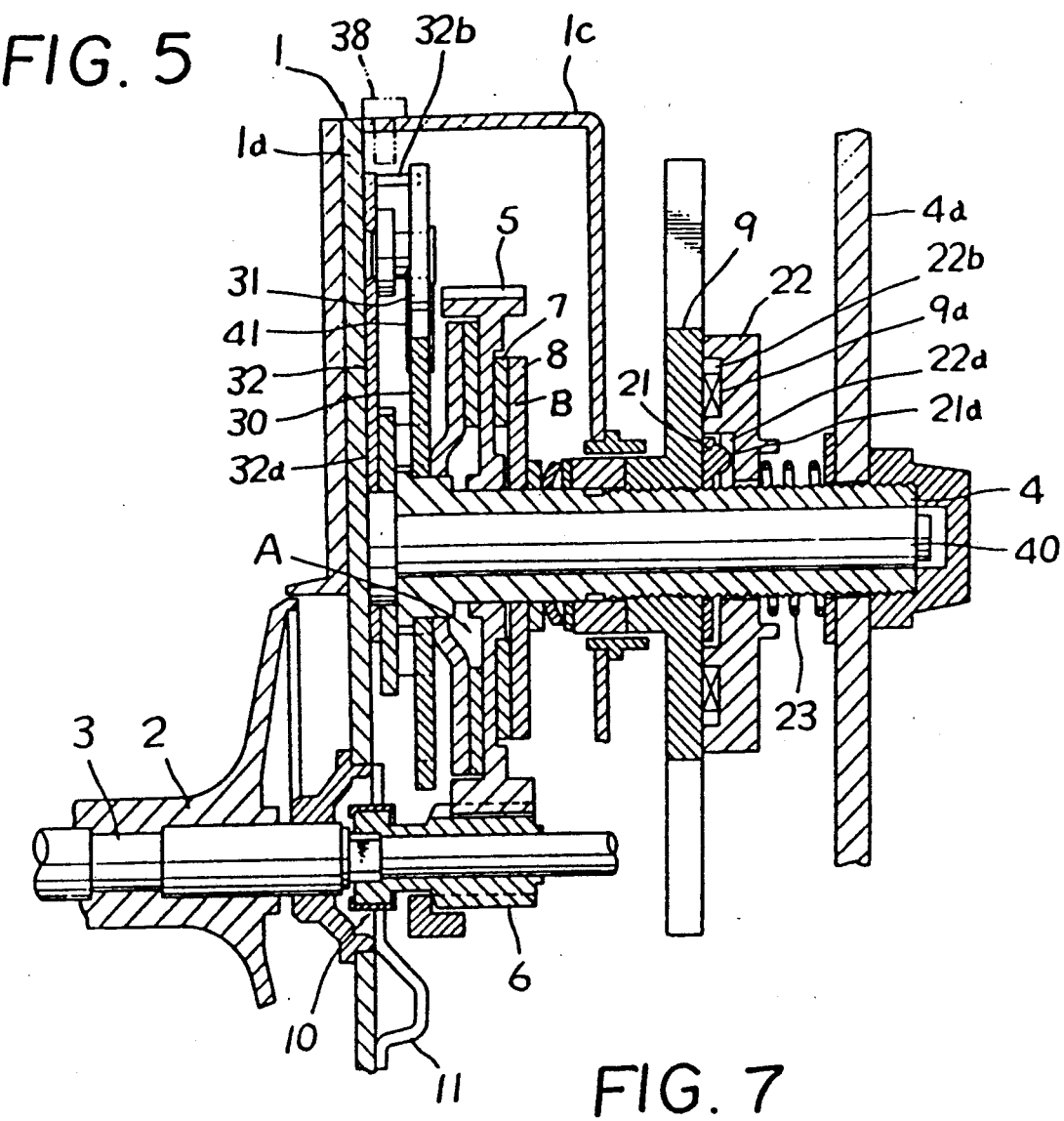
FIG. 5 is a partial sectional view of a fourth embodiment of the invention, corresponding to FIG. 1.
Figure 7:
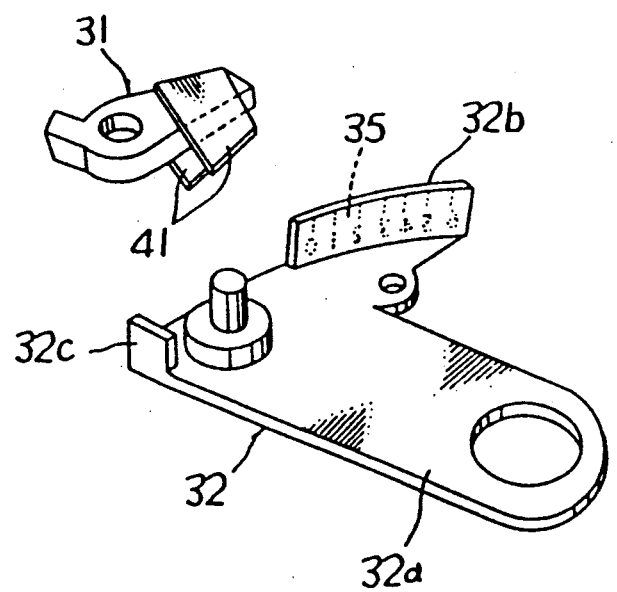
FIG. 7 is a perspective view of an anti-reverse-rotation pawl and a swinging member only.
Figure 6:
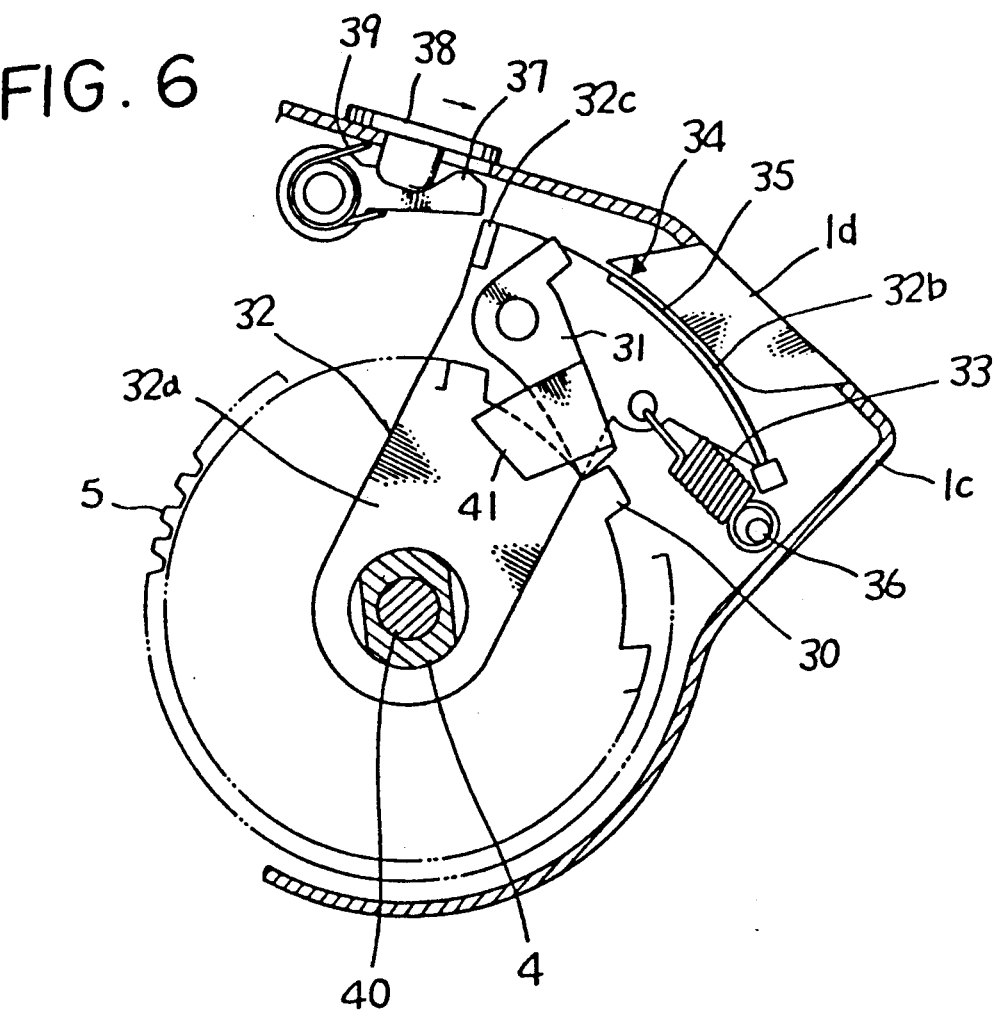
FIG. 6 is a partially cutaway side view of the principal portion of the fourth embodiment.
Figure 8:
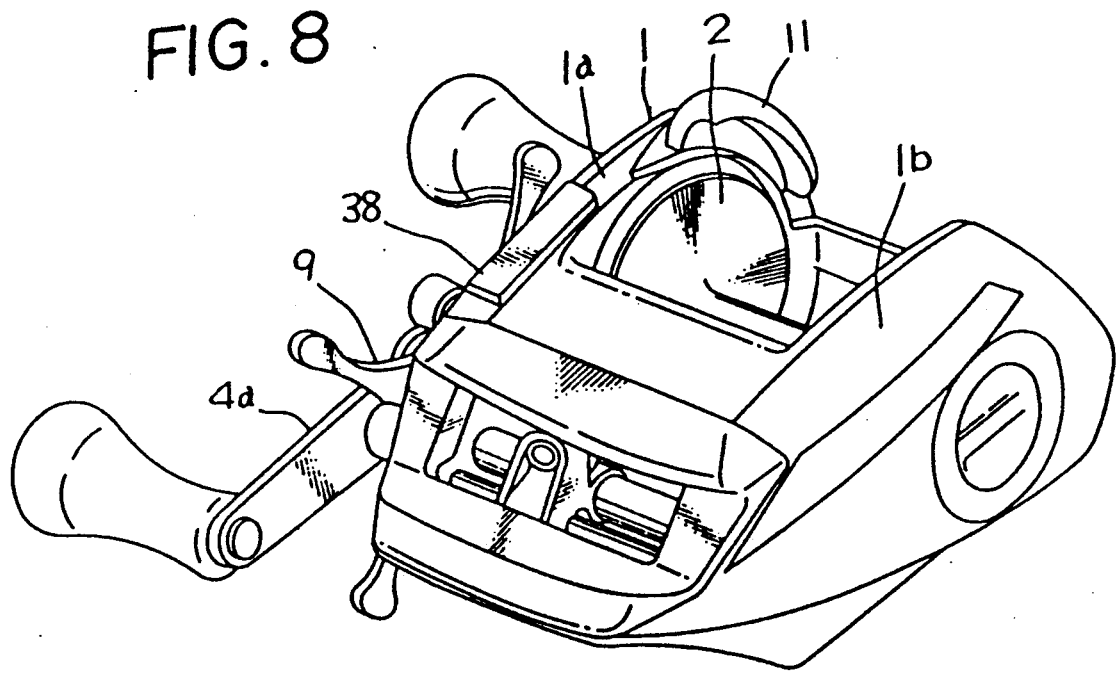
FIG. 8 is a perspective view of the entire fourth embodiment in FIG. 5.

In FIG. 5, the main gear 5 and drag disc 8 are supported to the handle shaft 4 to form a drag mechanism B the same as in the aforesaid embodiments. An anti-reverse-rotation gear 30 is supported to the handle shaft 4, and a swinging member 32 is supported swingably to the fixed shaft 40 rotatably supporting the handle shaft 4. An anti-reverse-rotation pawl 31 engageable with the anti-reverse-rotation gear 30 to restrain the handle shaft 4 from reverse rotation is pivoted to the fore end portion of the swinging member 32, thereby being displaceable in the rotating direction of the anti-reverse-rotation gear 30 with respect to the side frame 1a through the swing member 32, and an elastic member 33 comprising a coil spring is interposed between the swinging member 32 and the side frame 1a as shown in FIG. 6. A window 1d is provided at a cover 1c at the first side frame 1a, and a pointer 34 is provided at the edge of the window 1d. A display 35 corresponding to the pointer 34 and displaying the braking force of the drag mechanism B is provided at the swinging member 32, thereby enabling the display 35 to be viewed from the exterior through the window 1d.

In the above construction, the swinging member 32 is provided with a plate-like body 32a, which has at one end a through bore and extends along the side frame 1a, and with a projection 32b bent perpendicularly from the utmost end of the body swinging member 32 is supported to the fixed shaft 40 swingably through the through bore. The anti-reverse-rotation pawl 31 is supported to the fore end portion of the body 32a and one end of the elastic member 33 is retained thereto. A stopper 32c to abut against a lock member to be discussed below is provided at the body 32a and the display 35 is provided at the projection 32b.

A spring holder 36 is provided at the first side frame 1a and retains the other end of the elastic member 33. At the first side frame 1a is pivoted a lock member 37 abutting against the stopper 32c at the swinging member 32 to regulate the swinging motion of swinging member 32 and an operating member 38 for the lock member 37 is movably supported to the cover 1c. The lock member 37 is biased by a spring 39 interposed between the lock member 37 and the cover 1c in the direction of moving away from the swinging member 32, the operating member 38 being operated to swing the lock member 37 against the spring 39 to abut against the stopper 32c, thereby restricting the swinging member 32 from swinging in the direction of deflecting the elastic member 33.

The anti-reverse-rotation pawl 31 is provided at both sides of its fore end portion with a pair of friction plates 41 abutting against both sides of the outer peripheral portion of the anti-reverse-rotation gear 30, so that, when the anti-reverse-rotation gear 30 rotates in reverse, the anti-reverse-rotation pawl 31 swings in the direction of engaging with the anti-reverse-rotation gear 30 through the friction plates 41, and when the gear 30 normally rotates, the pawl 31 swings in the direction of moving away from the gear 30 through the friction plates 41.

In addition, in the fourth embodiment, the same as in the first embodiment, a reference member 21 having a projecting reference portion 21a is non-rotatably and axially movably supported to the handle shaft 4 and a position specifying member 22 having a recessed position specifying portion 22a corresponding to the reference portion 21a is provided shiftably with respect to the adjuster 9, so that the position specifying portion 22a and reference portion 21a coincide with each other to accurately put the adjuster 9 in the optimum position.

In the fishing reel constructed as described above prior to fishing, the adjuster 9 is rotated to preset the braking force of the drag mechanism corresponding to a target fish.

Figure 9:
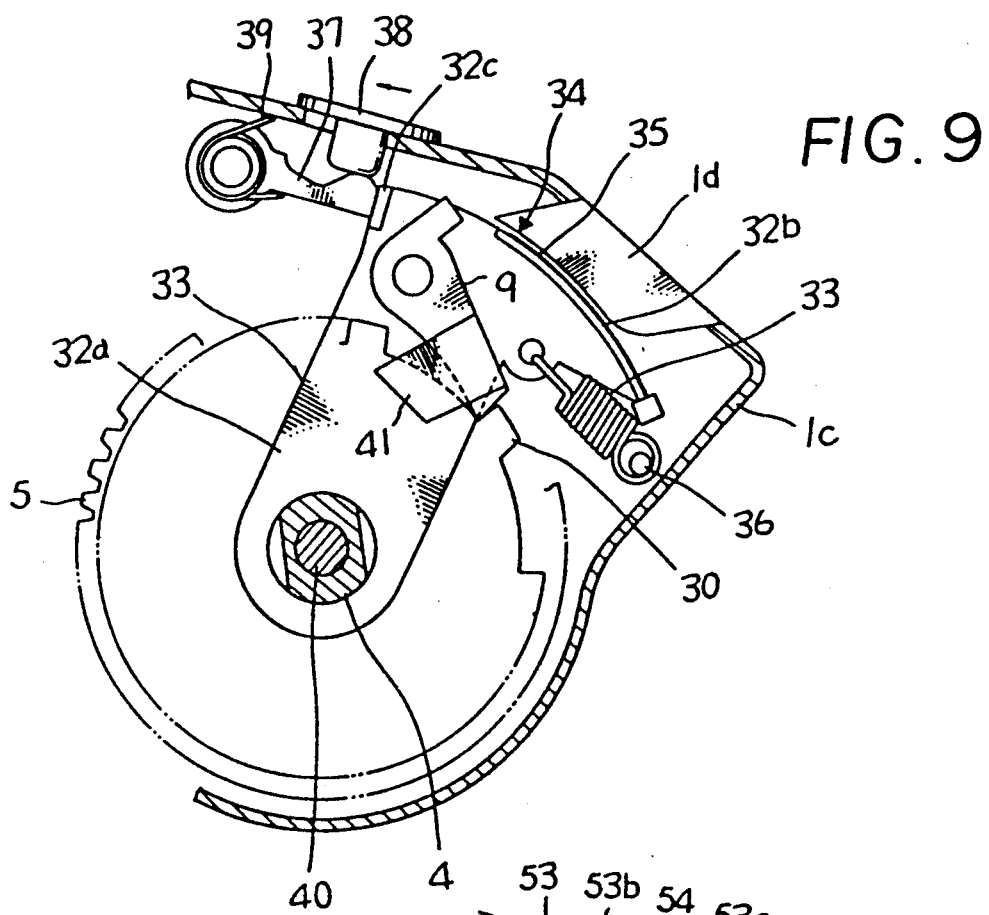
FIG. 9 is a partially cutaway side view illustrating operation of a lock member, corresponding to FIG. 6.

Referring to FIG. 6, in the state where the swinging member 32 is displaceable from the locking position in FIG. 9 with respect to the first side frame 1a, the fishing line wound on the spool 2 is pulled to rotate the spool 2 in reverse or the spool 2 is directly rotated in reverse. Hence, the drag plate 7, drag disc 8, handle shaft 4 and anti-reverse-rotation gear 30 rotate integrally in the direction of reverse rotation through the spool shaft 3, clutch means 10, pinion 6 and main gear 5, so that the anti-reverse-rotation pawl 31 engaging with the anti-reverse-rotation gear 30 and supported to the swinging member 32 is displaced following the gear 30 in the reverse rotation direction thereof overcoming a force of elastic member 33. When an elastic restoring force thereof becomes larger than the force equivalent to the braking force set by the drag mechanism B, the gear 30, handle shaft 4 and drag disc 8 stop rotation thereof.

At a location where the rotation of gear 30 stops, the scale at the display 35 coincident with the pointer 34 is read to ensure the accurate braking force.

In this case, the handle shaft 4 is rotated, and the anti-reverse-rotation-pawl 31 returns by the elastic restoring force of elastic member 33 through the swinging member 32. After the pawl 31 returns, the operating member 38 is moved in the direction of the arrow in FIG. 6 to allow the lock member 37 to abut against the stopper 32c as shown in FIG. 9, thereby restraining the pawl 31 from displacement with respect to the first side frame 1a. Thus, the spool 2, during the fishing, is prevented from rotating by tension applied to the line and under a force smaller than the braking force of the drag mechanism B.

At the time of checking the accurate braking force of the drag mechanism B, even when the lock member 37 abuts against the swinging member 32 to block displacement of the anti-reverse-rotation pawl 31 with respect to the first side frame 1a, the position specifying member 22 is rotated with respect to the adjuster 9 to allow the position specifying member 22 to coincide with the reference portion 21a, and the adjuster 9 is operated to change the braking force of the drag mechanism B corresponding to a pulling force of a hooked fish. An adjuster 9, after the fishing, is returned to the position where the position specifying portion 22a coincides with the reference portion 21a, whereby the adjuster 9 can easily and accurately be returned to the position where the preset braking force can be obtained.

Alternatively, an elongate slot concentric with the handle shaft 4 may be provided at the side frame 1a and may support the anti-reverse-rotation pawl 31 so that the elastic member 33 may be interposed between the side frame 1a and the anti-reverse-rotation pawl 31.

The display 35 may alternatively be provided directly on the anti-reverse-rotation pawl 31.

Also, the display 35 may alternatively be provided at the reel body 1 and the pointer 34 at the anti-reverse-rotation pawl 31.

Also, the elastic member 33 formed of a coil spring which is tensile may alternatively be compressed, which is not particularly defined.

The lock member 37 is not indispensable. In the embodiment without a locking member, the maximum displacement of anti-reverse-rotation pawl 31 is preset to thereby restrain the displacement thereof at the position of the maximum displacement. Alternatively, the anti-reverse-rotation pawl 31 is restricted so as not to be displaced more than a predetermined range in the positional relation between the pawl 31 and the swinging member 32 and anti-reverse-rotation gear 30 when the pawl 31 is displaced.

Also, the reference position setting mechanism shown in FIG. 5 may be changed in structure as shown in FIG. 4.

The fourth embodiment of the invention, which can ensure the preset accurate braking force with checking being done at the handle shaft side, can be constructed at the spool side portion the same as in the present fishing reel, thereby solving the problem of the fishing line becoming tangled. Furthermore, the spool 2 is exchangeable as easily as in the conventional reels.

Furthermore, since the anti-reverse-rotation pawl can be utilized, the fishing reel is simple in construction and inexpensive to produce in comparison with the fishing reel which provides a particular rotary member at the spool shaft for checking the braking force.

In addition, in FIGS. 5 through 9, components having the same construction as those in FIGS. 1 through 4 are designated with the same reference numerals.

Next, explanation will be given on a fifth embodiment of the invention shown in FIGS. 10 through 13.

The fifth embodiment, the same as in the fourth embodiment, is so constructed that a drag mechanism B is formed, an anti-reverse-rotation gear 50 is supported to the handle shaft 4, an anti-reverse-rotation pawl 51 engageable with the anti-reverse-rotation gear 50 is pivoted to a side plate 1e of a main member at the first side frame 1a through a pivot shaft 52, and an operating member 53 for the anti-reverse-rotation pawl 51 is slidably supported to a cover 1c, so that the pawl 51 engages with the gear 50 to restrain the handle shaft 4 from reverse rotation.

The anti-reverse-rotation pawl 51 is biased by a pawl spring (not shown) interposed between the pawl 51 and the side plate 1e in the direction of engaging with the anti-reverse-rotation gear 50, and an arm 51a is provided at one end of the anti-reverse-rotation pawl 51 at the pivoted side thereof. One engaging projection 53a engageable with the arm 51a is provided at the operating member 53.

The operating member 53, as shown in FIG. 12, is provided with an operating portion 53b projecting outwardly through an elongate guide bore 54c provided at the upper wall of the cover 1c, the engaging projection 53a, and two engaging projections 53c opposite thereto.

An elastic member 55 of a coil spring engages at one end with a drag disc 80 and at the other end with a control 56 pivoted to the pivot shaft 52, and a window 1f is provided at the cover 1c at the portion thereof opposite to the outside surface of the drag disc 80. A pointer 57 is provided at the outside of the edge of window 1f, and a display 58 corresponding to the pointer 57 and displaying the braking force of the drag mechanism B is provided at the outside surface of the outer peripheral portion of the drag disc 80, the display 58 being visible from the exterior.

In the above construction, at one end of the elastic member 55 is provided a first engaging end 55a extending radially inwardly from the coil and at the other end is provided a second engaging end 55b hooked radially outwardly. The drag disc 80 is provided at the outside surface of an intermediate portion thereof with a cylindrical spring holder 80a having a retaining bore, so that the coiled portion of spring 55 is supported to the spring holder 80a and the first engaging end 55a is inserted into the retaining bore, thereby rotating the elastic member 55 together with the drag disc 80.

The control 56 is mounted on the fore end of the extended pivot shaft 52 for the pawl 51 and is pivoted to the side plate 1e. Control 56 is provided at its fore end portion with a control projection 56a engageable with the second engaging end 55b and at its root portion with an arm 56b projecting therefrom, the arm 56b engaging with the two engaging projections 53c at the operating member 53, so that, when the anti-reverse-rotation pawl 51 engages with the anti-reverse-rotation gear 50, the control 56 is swung in the direction of moving away from the elastic member 55 to disengage the control projection 56a from the second engaging end 55b. When the anti-reverse-rotation pawl 51 disengages from the anti-reverse-rotation gear 50, the control 56 swings toward the elastic member 55, thereby engaging the control projection 56a with the second engaging end 55b. Alternatively, the control 56 may associate with the anti-reverse-rotation pawl 51 without providing the engaining projections 53c.

Figure 10:
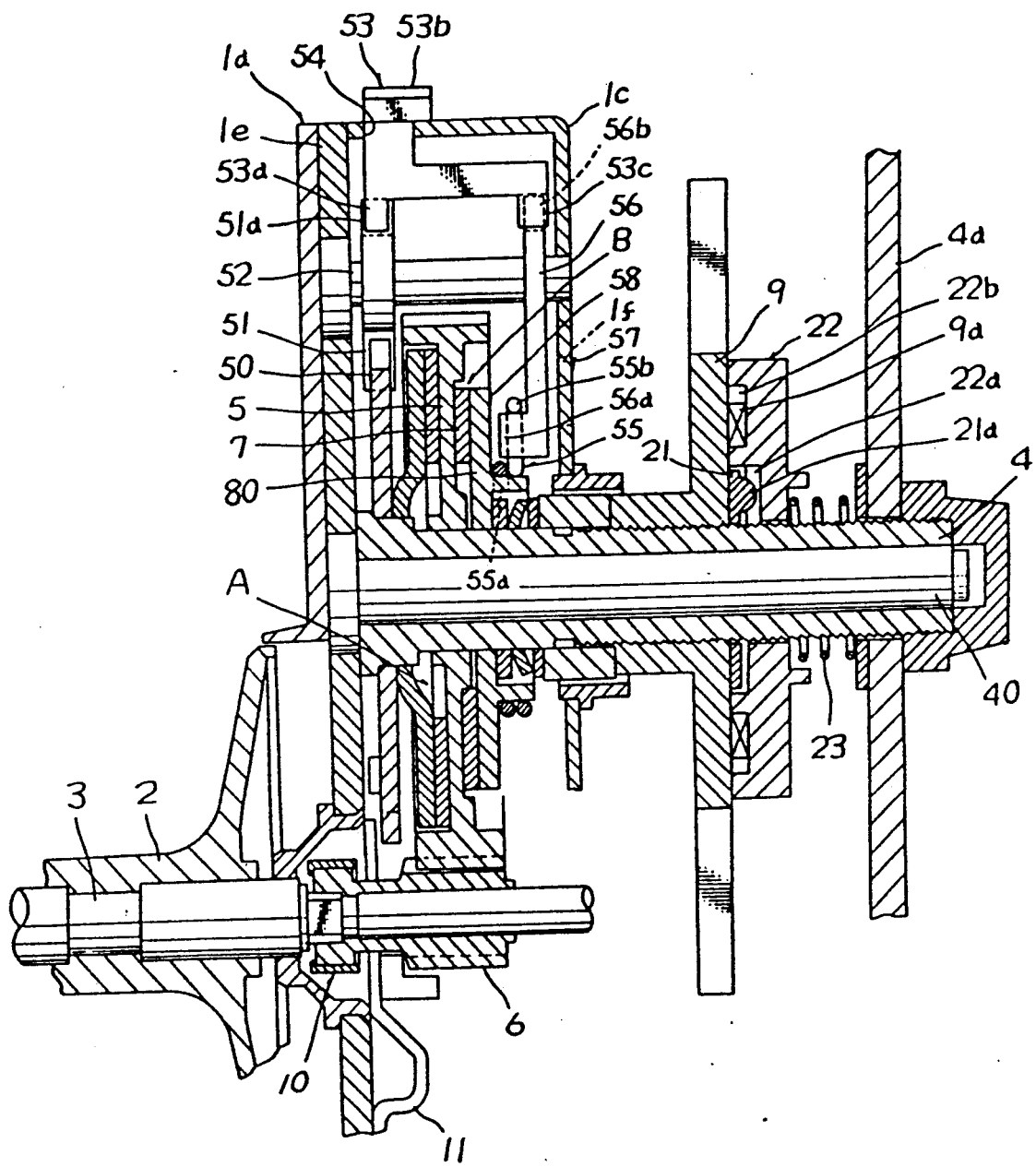
FIG. 10 is a partially cutaway sectional view of a fifth embodiment of the invention, corresponding to FIG. 1.

In addition, in the fifth embodiment shown in FIG. 10, a reference member 21 having a projecting reference portion 21a is non-rotatably and axially movably supported to the handle shaft 4 and a position specifying member 22 having a recessed position specifying portion 22a corresponding to the reference portion 21a is provided at the adjuster 9 to be position-changeable with respect thereto, so that the position specifying portion 22a coincides with the reference portion 21a, thereby enabling the adjuster 9 to be positioned to obtain the optimum braking force.

When the fishing reel constructed as described above is used, the same as in the former embodiments, the adjuster 9, prior to fishing, is operated to preset the braking force of the drag mechanism B corresponding to a target fish.

Figure 11:
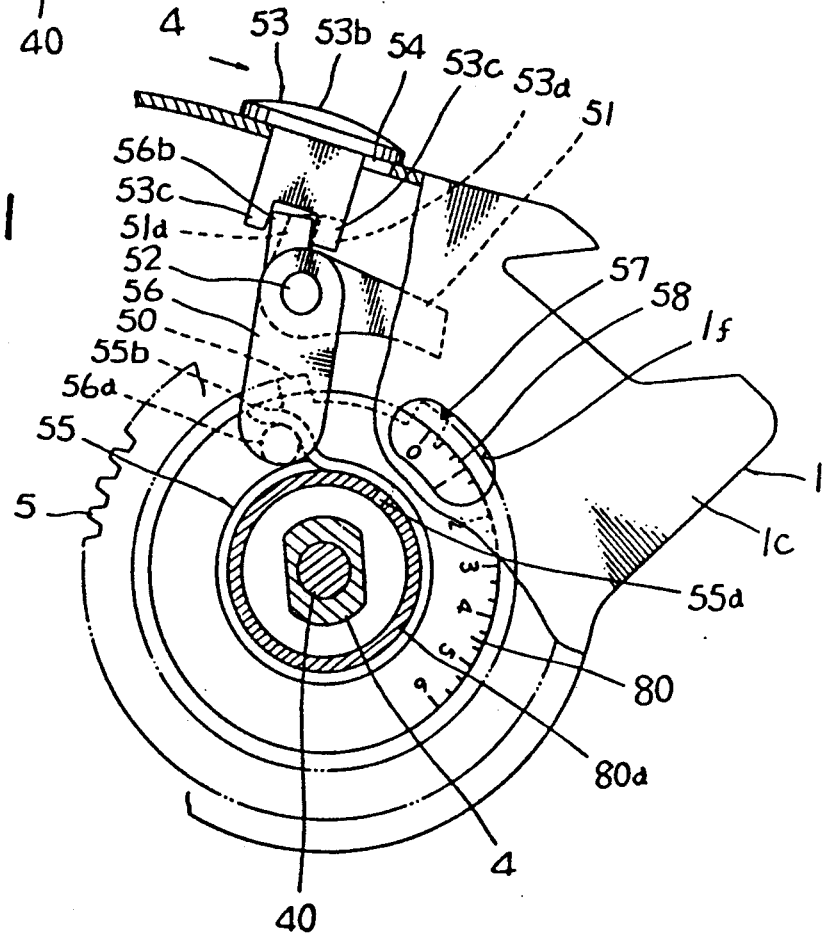
FIG. 11 is a partially cutaway side view of the principal portion of the fifth embodiment in FIG. 10.

As shown in FIG. 11, the second engaging end 55b engages with the control projection 56a at the control 56, and in the state where the elastic member 55 is restrained from rotation together with the drag disc 80, the fishing line wound on the spool 2 is pulled to rotate the spool 2 in reverse or the spool 2 is directly rotated in reverse. Hence, the drag plate 7, drag disc 80 and handle shaft 4 are integrally rotated through the spool shaft 3, clutch means 10, pinion 6 and main gear 5, whereby the elastic member 55 retained at one end thereof to the drag disc 80 is elastically deformed in the direction of enlarging its coil diameter.

When an elastic restoring force of elastic member 55 is larger than a force equivalent to the braking force set by the drag mechanism B, the drag disc 80 and handle shaft 4 stop rotation thereof through the elastic member 55.

Then, at a location where the drag disc 80 and handle shaft 4 stop rotation thereof, the scale of the display 58 coincident with the pointer 57 is read, thereby enabling the accurate braking force of the drag mechanism B to be checked.

Also, at the time when the accurate braking force of drag mechanism B is checked, the operating member 53 is moved in the direction of the arrow in FIG. 11 and the anti-reverse-rotation pawl 51 engages with the anti-reverse-rotation gear 50 as shown in FIG. 13. In this case, the control 56, as shown in FIG. 13, swings in the direction of moving away from the elastic member 55 (clockwise in FIG. 11), so that the control projection 56a retracts to disengage from the second engaging end 55b. Accordingly, during the fishing, the handle shaft 4 is restrained from reverse rotation and the drag mechanism B is operated to wind the line onto the spool 2.

After the accurate braking force of the drag mechanism B is checked, the position specifying member 22 is rotated with respect to the adjuster 9 to allow the position specifying portion 22a to coincide with the reference portion 21a, so that even when the adjuster 9 is operated corresponding to the hooked fish and the fish is caught by changing the braking force of drag mechanism B, the adjuster 9 is returned to the coincident position so as to be positioned easily and accurately to obtain the optimum braking force.

Alternatively, the elastic member 55 may be interposed between a member separate from the drag disc 80 and the first side frame 1a, or between the handle shaft 4 and the same.

The control 56 may alternatively be supported to the first side frame 1a without using the pivot shaft 52, or may be operated from the exterior without using the operating member 53.

The control 56 may alternatively be constructed to disengage from the handle shaft 4 or a member at the handle shaft side.

Also, the display 58 may alternatively be provided at the reel body 1 and the pointer 57 at the handle shaft 4 or a member supported non-rotatably relative thereto.

The elastic member 55 may alternatively be compressed rather than expanded in diameter, which is not particularly defined.

In addition, in an embodiment in which the coil spring is contracted in diameter to check the braking force, for example, the fishing reel of the invention is constructed as shown in a sixth embodiment in FIG. 14.

In the sixth embodiment, an elastic member 65 is retained at a first emgaging end 65a thereof, the same as in the fifth embodiment, to a retaining bore at a drag disc 80. A control 66 is formed of a semicircular bent portion 66a and an arm 66b bent outwardly from one end thereof. An elongate slot 66c formed at the arm 66b is supported to a pivot shaft 52 supporting an anti-reverse-rotation pawl 61. At the utmost end of the bent portion 66a are provided a control projection 66e projecting inwardly to engage with a second engaging end 65b of the elastic member 65 and an elongate slot 66d. A pin 67 erected from the covers c is inserted therein. Between the bent portion 66a and the cover 1c is interposed a return spring 68 for biasing the control 66 in the direction of maintaining engagement of the control projection 66c with the second engaging end 65b, and an operating member 63 supported to the cover 1c is provided with a cam face 63a engageable with the end face of the arm 66b of the control 66.

The operating member 63 is moved in the direction of the arrow X in FIG. 14 to move the control 66 in the direction of the arrow Y in FIG. 14 through the cam face 63a, thereby disengaging the control projection 66e from the second engaging end 65b. In this case, the engaging projection 63b at the operating member 63 disengages from an arm 61a at the pawl 61 and the anti-reverse-rotation pawl 61 engages with the anti-reverse-rotation gear 60 through a pawl spring (not shown). Also, the operating member 63 is restored to restore the control member 66 by the return spring 68, and the control projection 66e, as shown in FIG. 14, moves toward the second engaging end 65b to engage therewith. The pawl 61 swings against the spring pawl and disengages from the anti-reverse-rotation gear 60. In the sixth embodiment, a positioning mechanism to maintain the operating member 63 in its operating position is provided between the inner surface of the cover 1c and the operating member 63. The positioning mechanism comprises a projection 69 provided at the inner surface of the cover 1c and a leaf spring 70 having an engaging portion 70a engageable with the projection 69 and a rectangular fitting bore 70b, so that the operating member 63 is fitted therein and held by a lock pin 71. When the operating member 63 is operated, the engaging portion 70a rides over the projection 69 to maintain the operating position of the operating member 3.

The cover 1c, as shown in FIG. 14, is provided at its side wall with a window 1d and at the edge thereof with a pointer 72 and the drag disc 80 is provided with a display 73.

In addition, the components in FIGS. 10 through 14 having the same structure as those in FIGS. 1 through 4 are designated with the same reference numerals.

Alternatively, the reference position setting mechanism in FIG. 10 may be changed in construction as shown in FIG. 4.

Although several embodiments have been described, they are merely exemplary of the invention and not to be construed as limiting, the invention being defined solely by the appended claims.

What is claimed is:

1. In a double bearing fishing reel comprising:
    a reel body having a pair of side frames;
    a spool shaft supporting a spool and journalled to said reel body,
    a drive mechanism for winding a fishing line onto said spool, said drive mechanism comprising a driving shaft, a master gear mounted to said driving shaft in such a manner that it can rotate relative thereto, and a pinion supported to said spool shaft and engageable with said master gear;
    a drag mechanism for applying a braking force against rotation of said master gear with respect to said driving shaft when said driving shaft is driven to rotate, said drag mechanism comprising an adjuster for adjusting said braking force;
    a braking force measuring mechanism for measuring the braking force set by said adjuster, said braking force measuring mechanism comprising:
    an anti-reverse-rotation gear mounted to said driving shaft in such a manner that it cannot rotate relative thereto and for restraining said driving shaft from reverse rotation;
    a pawl supporting member having an anti-reverse-rotation pawl which is brought into engagement with said anti-reverse-rotation gear when said driving shaft rotates reversely, and supported to said driving shaft in such a manner that it can rotate relative thereto;
    an elastic member interposed between said pawl supporting member and said reel body, the said elastic member applying a resistance against rotation of said pawl supporting member when said driving shaft rotates reversely, said elastic member enabling the rotation of said pawl supporting member to be stopped when a torque acting in the reverse rotation direction and overcoming the braking force set by said adjuster is exerted to said pawl supporting member;
    a display for displaying the braking force of said drag mechanism on the basis of a position at which the rotation of said pawl supporting member is stopped, said display being provided at one of said pawl supporting member and said reel body; and
    a pointer for pointing to said display, said pointer being provided at the other of said pawl supporting member and said reel body.

2. A double bearing fishing reel according to claim 1, wherein said reel body is provided with a lock member regulating rotation of said pawl supporting member in a direction of reverse rotation and an operating member for operating said lock member toward a regulating position and a non-regulating position.

* * * * *